Oct. 14, 1941.   A. E. KARLBERG   2,259,422
SHAFT SEAL
Filed Dec. 7, 1939

INVENTOR.
Arvid E. Karlberg

Patented Oct. 14, 1941

2,259,422

UNITED STATES PATENT OFFICE 2,259,422

SHAFT SEAL

Arvid E. Karlberg, Chicago, Ill., assignor to Chicago Seal Company, Chicago, Ill., a corporation of Illinois Application December 7, 1939, Serial No. 307,977

1 Claim. (Cl. 286—7)

This invention relates to an improvement in the method of sealing a rotating shaft against fluid leaks.

An object of this invention is to provide a seal for a shaft that will function without the use of a bellows.

Another object is, a seal that is self alining so as not to require the service of an expert to install.

It is generally known that a bellows is a very delicate piece of mechanism. It is a costly item and is very hard to handle due to its frail structure. It can be stressed beyond its limit of performance and when this occurs, it becomes practically useless. Furthermore, with the use of a bellows in a seal assembly, having a certain size seal face, a much larger spring is necessary to compensate for the pressure in the crankcase that tends to collapse the bellows, because the area of effective pressure on the bellows is much greater than in my novel structure. The excessive spring pressure produces a greater friction against the seal face and results in a higher cost for electrical consumption during operation. It will also cause the seal face to become damaged more rapidly should it become a trifle dry.

In my construction, applied to the same size seal face, the effective area is reduced considerably, allowing a lighter spring to be used.

Tests have shown that my new type of seal runs very efficiently and effectively when using a crankcase pressure as high as 125 pounds.

In my invention I have substituted the bellows with an outer metallic tubular member, an elastic ring for sealing and another metallic member provided with a concaved surface which acts as a cradle in which the elastic seal ring may rock. This combination makes a very rugged, interchangeable structure.

In making up a complete shaft seal mechanism, I use part of my novel seal described in my application for patent filed November 24, 1939, Serial No. 305,930, now Patent No. 2,245,106, issued June 10, 1941. This, of course, is only necessary when the seal face on the shaft becomes damaged, or may be used instead of grinding a seal face on a new shaft shoulder.

This invention will be best understood by referring to the accompanying drawing, in which, Figure 1 shows a complete assembly in cross section with my seal assembly in place.

Figure 1:
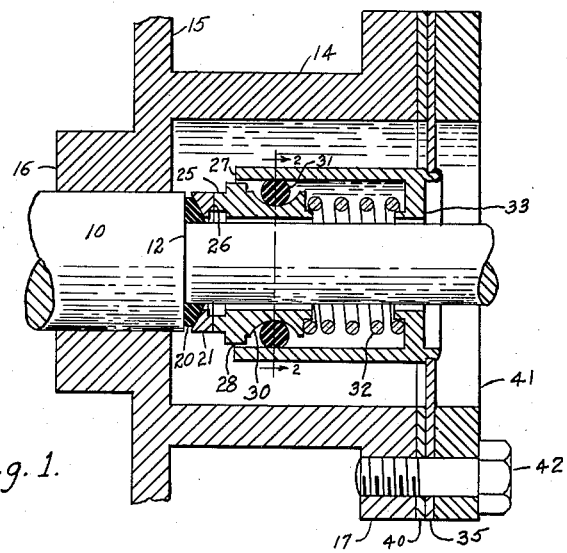
Figure 2:
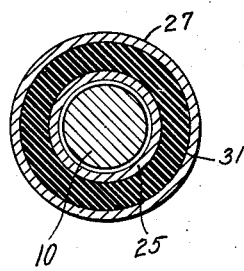
Figure 2 shows a cross section through section 2—2 of Figure 1, wherein the elastic seal ring is confined between the two metallic members that provide the fluid-tight joints.
Figure 3:
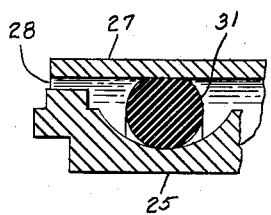
Figure 3 shows an enlarged view of the movable seal junction in a normally assembled state.

By referring to the numerals in the drawing, the shaft 10, having a shoulder 12, extends through a hub 14 of a compressor body 15, and is supported by a bearing 16 in the compressor body. At the end of the hub is a flange 17, to which my seal assembly is attached. Against the shoulder 12 is placed an elastic ring member 20 which acts as a fluid-tight seal and a means for driving a seal face member 21 in a rotating manner. The nose piece 25 is provided with a seal face to mate with 21 at 26. The nose piece 25 is partially disposed in the cavity of a tubular member 27 and of such a diameter that a clearance 28 is provided which allows the nose piece to float and wabble a reasonable amount to take care of any misalignment that may exist. The portion of the nose piece that is shrouded within the tubular member is provided with an arc shaped recess or groove 30 the axis of the arc being transverse to the axis of the nose piece. Nested in this groove, is an elastic ring 31, having a circular section. When assembled, the outside of the elastic ring fits tightly into the bore of the tubular member. Against the nose piece, a spring 32, under compression, and backed up by an inner flange 33, retains the nose piece of the stationary seal against the rotating seal face. Attached to the tubular member is a disc 35 that supports the complete stationary assembly. This plate with a gasket 40 is fastened to the flange 17 with a plate 41 and bolts 42.

Figure 4:
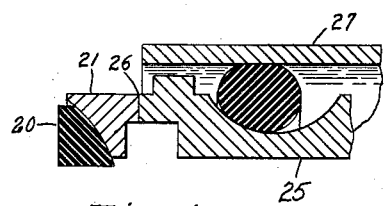
Figure 4 shows the approximate condition of the elastic ring in a wedged condition due to the recession of the cradled member when in a compressed or operating position.

When the seal assembly is put in place and clamped, the member 25 is pushed further into the tube and the elastic ring is wedged between the tube and the nose piece, with the approximate shape shown in Figure 4.

This novel piece of mechanism has a universal joint movement which provides self-aligning characteristics that allows the seal faces to make a perfect contact with each other. Also it is very simple to replace the elastic ring, should it become damaged, by simply removing the nose piece from the tubular housing, replace the ring with a new one and insert the nose back in place. The seal assembly is then ready for use.

Another novel feature that is obvious in my invention is, the action that will occur when the crankcase or internal pressure is built up against the nose piece and the elastic floating-seal ring.

The fact that the elastic ring's section is of circular form, and of a diameter that is greater than the distance between the bottom of the cradled groove 30 in the nose piece and the inside diameter of the tubular housing, it is adapted to roll in or out as the nose piece reciprocates and a fluid-tight joint is maintained because of the squeezing effect. Now then, should the pressure increase to a value where the elastic ring is forced outwardly from its position with respect to the atmosphere, the hazard of a leak to the atmosphere will be lessened, due to the fact that the ring, being resilient, will be forced to a narrower space in a sort of wedging action, creating tighter joints against the housing and the cradled portion of the nose piece. In the present form of the invention it will be noted that the depth of the groove 30 decreases in directions towards its ends from and on both sides of a medial zone, and that the said element 31 is of a cross-sectional dimension lengthwise of the axis of the member 25, substantially equal to that of the zone.

Furthermore, the depth of the groove 30 in said zone is less than the cross-sectional diameter of said sealing element, so that when the latter is seated in the groove and the member 25 is telescoped into the housing 27, the sealing element 31 will be compressed to form a fluid tight joint.

With this invention it will be manifest that when the sealing element 31 is displaced with respect to such zone either by fluid pressure thereagainst or by the rocking or relative movement of the member 25 with relation to the housing 27, the sealing element will be further compressed and thereby always maintain a fluid tight seal. This wedging action of the elastic material, in making a tighter joint however, will not increase the operating load on the compressor because it is developed between stationary members of the seal element. The nose piece is protected against breaking its seal with the shaft-seal-face by being backed-up with a spring of proper design to withstand any reasonable pressure that may be applied against it, as may occur in practice.

I claim:

In association with a housing member having a shaft extending therethrough and rotatable with respect thereto, the combination of a sealing organization embodying a sleeve rotatably mounted with and sealed at one end to the shaft, a non-rotatable sealing member supported by said housing and having a portion thereof contacting and movable with respect to said sleeve and having an open annular arc shaped peripheral recess the axis of which is transverse to the axis of said sealing member, and an annular resilient sealing element the body of which is substantially round in cross-section, said ring being disposed within said recess and contacting the inner peripheral face of said housing, the depth of said recess being less than the normal cross-sectional diameter of said sealing element, whereby the sealing element will be compressed between the housing and the bottom of the recess, the maximum chord of said arc being slightly greater than the diameter of the body of the sealing ring and only sufficient to permit a slight rolling movement of said resilient element in said recess, the said sealing element being further compressed substantially as it is moved axially within said recess.

ARVID E. KARLBERG.